US011973727B1

(12) United States Patent
Fries

(10) Patent No.: US 11,973,727 B1
(45) Date of Patent: Apr. 30, 2024

(54) SYSTEM AND METHOD FOR CUSTOMIZING AUTO-REPLIES TO INCOMING COMMUNICATIONS

(71) Applicant: Keystrokes, LLC., Sheridan, WY (US)

(72) Inventor: Ghilda Leah Fries, Severn, MD (US)

( * ) Notice: Subject to any disclaimer, the term of this patent is extended or adjusted under 35 U.S.C. 154(b) by 0 days.

(21) Appl. No.: 17/940,657

(22) Filed: Sep. 8, 2022

Related U.S. Application Data

(60) Provisional application No. 63/281,439, filed on Nov. 19, 2021, provisional application No. 63/242,248, filed on Sep. 9, 2021.

(51) Int. Cl.
*H04L 51/02* (2022.01)
*H04L 51/21* (2022.01)
*H04W 4/12* (2009.01)

(52) U.S. Cl.
CPC .............. *H04L 51/02* (2013.01); *H04L 51/21* (2022.05); *H04W 4/12* (2013.01)

(58) Field of Classification Search
None
See application file for complete search history.

(56) References Cited

U.S. PATENT DOCUMENTS

| | | | | |
|---|---|---|---|---|
| 7,334,021 B1 * | 2/2008 | Fletcher | ............... | G06Q 10/107 709/206 |
| 7,346,658 B2 * | 3/2008 | Simpson | ............... | H04L 67/535 379/19 |
| 7,475,109 B1 * | 1/2009 | Fletcher | ............... | G06Q 10/107 709/204 |
| 7,912,910 B2 * | 3/2011 | Banerjee | ............... | G06Q 10/107 709/224 |
| 8,150,385 B1 * | 4/2012 | Majeti | ............... | G06Q 10/107 455/418 |
| 8,385,517 B2 * | 2/2013 | Lahtiranta | ............... | H04M 1/7243 379/88.13 |
| 8,406,745 B1 * | 3/2013 | Upadhyay | ............... | H04M 3/533 455/414.3 |
| 8,452,839 B2 * | 5/2013 | Heikes | ............... | H04L 51/04 709/204 |
| 8,661,142 B2 * | 2/2014 | Scott | ............... | G06Q 10/10 709/227 |
| 8,666,375 B2 * | 3/2014 | Lee | ............... | H04M 3/42059 455/412.2 |

(Continued)

*Primary Examiner* — Backhean Tiv
(74) *Attorney, Agent, or Firm* — John Rizvi; John Rizvi, P.A.—The Patent Professor

(57) ABSTRACT

A system and method for transmitting customized auto-replies to incoming communications received from designated groups when an individual receiving an incoming communication is otherwise unavailable. More particularly, the individual is provided freedom from having to respond to incoming communications received on their mobile device, for example, when they are in a setting or circumstance in which having to respond to such received messages is impossible and/or inconvenient. In this way, receiving, by a mobile device, an incoming communication from a sending party to a receiving party associated with the mobile device, wherein the mobile device is currently in an auto-reply mode and identifying, by the mobile device, at least one designated contact group that the sending party is a member, the at least one designated contact group having been previously created by the receiving party associated with the mobile device.

17 Claims, 8 Drawing Sheets

(56) References Cited

U.S. PATENT DOCUMENTS

| | | | |
|---|---|---|---|
| 8,688,788 B2 * | 4/2014 | Wilson | G06Q 10/10 379/88.05 |
| 8,903,055 B2 * | 12/2014 | Brauninger | G06Q 10/109 379/265.09 |
| 9,100,809 B2 * | 8/2015 | Olincy | H04W 4/16 |
| 9,252,975 B2 * | 2/2016 | Boss | H04L 51/04 |
| 9,432,499 B2 * | 8/2016 | Hajdu | H04M 1/72412 |
| 9,467,400 B2 * | 10/2016 | Bhatia | H04L 51/42 |
| 9,615,225 B2 * | 4/2017 | Appelman | H04L 51/043 |
| 10,079,785 B2 * | 9/2018 | Sharp | G06N 20/00 |
| 10,243,889 B2 * | 3/2019 | Niu | G06F 16/9535 |
| 10,965,624 B2 * | 3/2021 | Mummidi | H04L 67/75 |
| 11,050,835 B2 * | 6/2021 | Delaney | G06F 21/316 |
| 11,088,969 B1 * | 8/2021 | van Doorn | H04L 51/02 |
| 11,297,014 B2 * | 4/2022 | Hajdu | H04L 51/58 |
| 2002/0187794 A1 * | 12/2002 | Fostick | H04L 51/58 455/466 |
| 2005/0076090 A1 * | 4/2005 | Thuerk | H04L 51/212 709/207 |
| 2005/0080868 A1 * | 4/2005 | Malik | G06Q 10/10 709/207 |
| 2006/0140361 A1 * | 6/2006 | Heikes | H04L 51/02 379/88.22 |
| 2007/0238474 A1 * | 10/2007 | Ballas | H04L 51/58 455/466 |
| 2007/0260694 A1 * | 11/2007 | Boss | H04L 51/04 709/207 |
| 2009/0037541 A1 * | 2/2009 | Wilson | G06Q 10/10 704/9 |
| 2011/0035453 A1 * | 2/2011 | Koul | H04L 51/04 709/206 |
| 2013/0254316 A1 * | 9/2013 | Heikes | H04L 51/04 709/206 |
| 2014/0206321 A1 * | 7/2014 | Mohapatra | H04L 51/02 455/466 |
| 2015/0195223 A1 * | 7/2015 | Appelman | H04L 51/214 455/466 |
| 2020/0120049 A1 * | 4/2020 | Galloway | H04L 51/02 |
| 2020/0195590 A1 * | 6/2020 | Lauer | H04W 4/14 |
| 2020/0259948 A1 * | 8/2020 | Keohane | H04M 1/72463 |
| 2021/0120124 A1 * | 4/2021 | Czarnecki | H04M 3/42093 |

* cited by examiner

SYSTEM AND METHOD FOR CUSTOMIZING AUTO-REPLIES TO INCOMING COMMUNICATIONS

CROSS-REFERENCE TO RELATED APPLICATIONS

This application claims the benefit of U.S. Provisional Patent Application 63/242,248, filed Sep. 9, 2021, and U.S. Provisional Patent Application 63/281,439, filed Nov. 19, 2021, which are each hereby incorporated by reference herein in their entirety.

FIELD OF THE INVENTION

The present invention relates generally to managing incoming communications to a user device, and more particularly, to a system and method that facilitates transmitting customized auto-replies to incoming communications received from designated contact groups.

BACKGROUND OF THE INVENTION

In today's Internet-age and instant communications, individuals are commonly communicating with one another through text messaging and/or voice communications using their mobile device (e.g., a smartphone). These communication vehicles allow for substantially instantaneous communications and many individuals have adopted so-called "texting" as their primary communications type and dispensing with traditional telephone/voice communications. Of course, a receiving party may be away from his or her mobile device and unavailable to engage in communications with another person at any particular time. In such a situation, a receiving party typically is considered to be "away." Some instant messaging (IM) client programs allow receiving parties to configure a preset and global "away message" that is sent as a textual message to any incoming communication from a sending party that attempts to message the receiving party while the receiving party's IM client program and device are configured in an away mode. In today's "now" society, individuals do not want to wait or wonder why a recipient did not respond right away to their transmitted message (or voice call) and with some particularity. Conversely, a recipient wants to be able to respond promptly in some fashion, so the correspondent knows what is going on or does not start to worry since the recipient normally responds right away to the receipt of a communication. Further, the increase in "texting while driving" has raised serious dangers on our roadways and has triggered major public awareness campaigns in an attempt to reduce such behavior. As such, there is a constant need for improved mechanisms and techniques to facilitate the exchange of various communication types in a safe and responsive manner when an individual is otherwise unavailable.

Accordingly, there is need for an improved technique for the exchange of incoming communication to a user device in a safe and responsive manner when an individual receiving an incoming communication is otherwise unavailable.

SUMMARY OF THE INVENTION

The present invention is directed to a system and method that facilitates transmitting customized auto-replies to incoming communications received from designated contact groups when an individual receiving an incoming communication is otherwise unavailable.

In a first implementation of the invention, a method is provided for transmitting customized auto-replies to incoming communications received from designated contact groups when an individual receiving an incoming communication is otherwise unavailable, the method comprising: (i) receiving, by a mobile device, an incoming communication from a sending party to a receiving party associated with the mobile device, wherein the mobile device is currently in an auto-reply mode; (ii) identifying, by the mobile device, at least one designated contact group that the sending party is a member, the at least one designated contact group having been previously created by the receiving party associated with the mobile device; (iii) retrieving, by the mobile device, a particular one auto-reply message specific to the at least one designated contact group identified, the particular one auto-reply message retrieved having been pre-selected by the receiving party and associated with the at least one designated contact group thereby; and (iv) transmitting, by the mobile device, the particular one auto-reply message retrieved to the sending party.

In a second implementation of the invention, a system is provided for transmitting customized auto-replies to incoming communications received from designated groups when an individual receiving an incoming communication is otherwise unavailable. The system comprising at least: a processor; a display, and a memory storing instructions that when executed cause the processor to perform operations comprising: (i) receiving an incoming communication from a sending party to a receiving party associated with a mobile device, wherein the mobile device is currently in an auto-reply mode; (ii) identifying at least one designated contact group that the sending party is a member, the at least one designated contact group having been previously created by the receiving party associated with the mobile device; (iii) retrieving a particular one auto-reply message specific to the at least one designated contact group identified, the particular one auto-reply message retrieved having been pre-selected by the receiving party and associated with the at least one designated contact group thereby; and (iv) transmitting the particular one auto-reply message retrieved to the sending party.

In a third aspect, an application (alternatively referred to herein as an "app") may be executed on the system and/or a receiving party's mobile device for transmitting customized auto-replies to incoming communications received from designated groups when an individual receiving an incoming communication is otherwise unavailable. The application comprising operations for (i) receiving, by a mobile device, an incoming communication from a sending party to a receiving party associated with the mobile device, wherein the mobile device is currently in an auto-reply mode; (ii) identifying, by the mobile device, at least one designated contact group that the sending party is a member, the at least one designated contact group having been previously created by the receiving party associated with the mobile device; (iii) retrieving, by the mobile device, a particular one auto-reply message specific to the at least one designated contact group identified, the particular one auto-reply message retrieved having been pre-selected by the receiving party and associated with the at least one designated contact group thereby; and (iv) transmitting, by the mobile device, the particular one auto-reply message retrieved to the sending party.

In another aspect, a global auto-reply message may be designated that overrides all customized auto-reply messages specific to any and all designated contact groups. In another aspect, the global auto-reply message serves as an outgoing global emergency auto-reply message (e.g., "help" or "SOS") in the event the receiving party is in distress or requires real-time emergency services.

In another aspect, the auto-reply message is sent to the sending party and all other members of the designated contact group to which the sending party is also a member thereof.

In another aspect, the receiving party creates a plurality of designated contact groups with each designated group having a particular one auto-reply message associated therewith.

In another aspect, the customizable auto-replies and designated contact groups are for use with auto-replies to incoming text messages.

In another aspect, the customizable auto-replies and designated contact groups are for use with auto-replies to incoming voice communications.

In another aspect, there is transmitting, by the mobile device, the particular one auto-reply message retrieved to each other member of the at least one designated contact group.

In another aspect, there is determining whether a global response option has been activated; and if the global response option is determined to be activated, then retrieving a global auto-reply message, and transmitting, by the mobile device, the global auto-reply message retrieved to each one of the one or more members of the at least one designated contact group identified in place of the particular one auto-reply message retrieved.

In another aspect, there is receiving an instruction to activate a global response option.

In another aspect, there is creating, by the receiving party, a plurality of designated contact groups.

In another aspect, there is creating an auto-reply message specific to each one of the designated contact groups in the plurality of designated contact groups.

In another aspect, each one of the designated contact groups in the plurality of designated contact groups comprise at least one contact designated by the receiving party together with contact information specific to the at least one contact designated.

In another aspect, there is updating the at least one designated contact group.

In another aspect, there is storing, in a memory of the mobile device, the plurality of designated contact groups created.

In another aspect, the plurality of designated contact groups comprise at least one designation of business associates, business contacts, extended family, immediate family, friends, and social acquaintances.

In another aspect, there is adding a new contact to the at least one designated contact group.

In another aspect, the at least one designated contact group that the sending party is a member thereof comprises location information useful for a location-based service to locate the sending party upon transmission of the incoming communication thereby.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
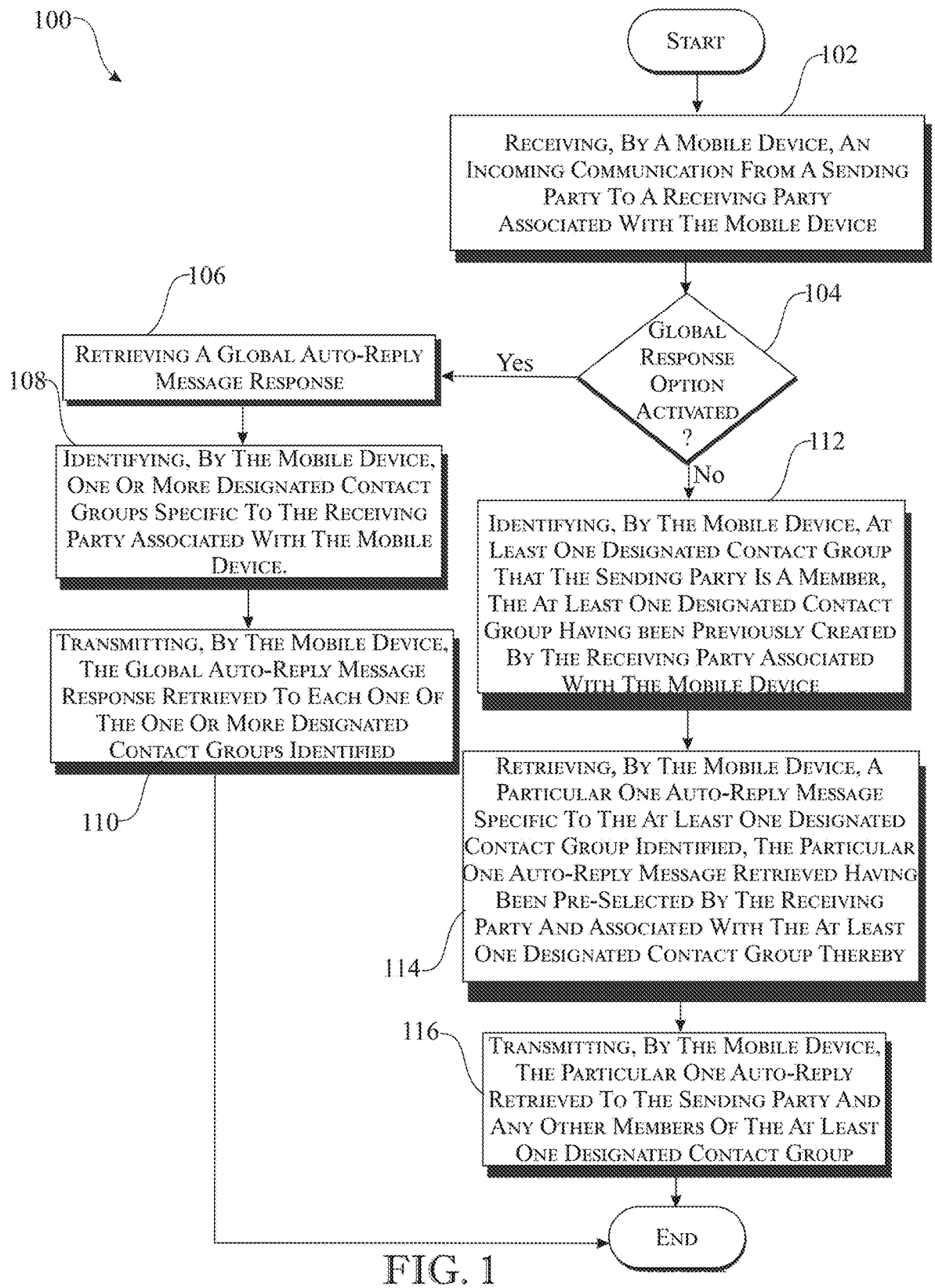
FIG. 1 presents a flowchart of illustrative operations for transmitting customized auto-replies to incoming communications received from contacts of designated groups when an individual receiving an incoming communication is otherwise unavailable in accordance with an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed to a system and method for transmitting customized auto-replies to incoming communications received from designated groups when an individual receiving an incoming communication is otherwise unavailable. More particularly, the individual is provided freedom from having to respond to incoming communications received on their user device (e.g., a mobile device) when they are in setting or circumstance in which having to respond to such received messages is impossible and/or inconvenient. The aspects of the embodiments herein provide for such operational and situational freedom by receiving, by a mobile device, an incoming communication from a sending party to a receiving party associated with the mobile device, wherein the mobile device is currently in an auto-reply mode, and identifying, by the mobile device, at least one designated contact group that the sending party is a member, the at least one designated contact group having been previously created by the receiving party associated with the mobile device. Thus, the receiving party is empowered with creating specifically designated contact groups (e.g., business associates, business contacts, extended family, immediate family, friends, and social acquaintances, to name just a few). This enables the retrieving, by the mobile device, a particular one auto-reply message specific to the at least one designated contact group identified, the particular one auto-reply message retrieved having been pre-selected by the receiving party and associated with the at least one designated contact group thereby. The mobile device then transmits the particular one auto-reply message retrieved to the sending party. In this way, the operations are activated and associated with a mobile telephone number specific to a mobile device of the user. Importantly, the customized auto-reply messaging aspects of the disclosed embodiments herein provide an advantageous improvement of practical applications that include communications management, messaging and mobile device operability.

FIG. 1 presents a flowchart of illustrative operations 100 for transmitting customized auto-replies to incoming communications received from contacts of designated groups when an individual receiving an incoming communication is otherwise unavailable in accordance with an embodiment. As shown, at step 102, receiving, by a mobile device, an incoming communication from a sending party to a receiving party associated with the mobile device, wherein the mobile device is currently in an auto-reply mode. In accordance with the principles of the disclosed embodiments, the incoming communication may be received from any communications platform employed by the sending party that facilitates voice communications (e.g., wireless communications networks) and/or messaging between parties, including, but not limited to, well-known social media applications (e.g., Facebook, LinkedIn, and WhatsApp, to name just few). As such, the incoming communications exchanged hereunder may be any type of communication including, but not limited, to text messages, instant messages (IM) and voice communications. At step 104, determining whether a global response option has been activated. That is, in an embodiment, the receiving party is able to designate the use of a global auto-reply message that overrides any and all customized auto-reply messages specific to any and all designated contact groups that would have been otherwise transmitted by the user device (e.g., a mobile device). Such global auto-reply designation will have an associated designated time duration (e.g., starting on a Monday at 8:00 a.m. and ending on a Friday at 6:00 p.m.) defining the total activation time. If so activated, at step 106, retrieving a global auto-reply message response, as previously designated by the receiving party. Then, at step 108, identifying, by the mobile device, one or more designated contact groups specific to the receiving party associated with the device, and, at step 110, transmitting, by the mobile device the global auto-reply message response retrieved to each member of the one or more designed contact groups identified. In a further aspect, the global auto-reply message response retrieved is sent to all sending parties whether or not they are a member of any designated contact group. In another aspect, the global auto-reply message serves as an outgoing global emergency auto-reply message (e.g., "help" or "SOS") in the event the receiving party is in distress or requires real-time emergency services. In this way, the first sending party to message the receiving party will receive the emergency global auto-reply message. If no global response option has been activated, at step 112, identifying, by the mobile device, at least one designated contact group that the sending party is a member, the at least one designated contact group having been previously created by the receiving party associated with the mobile device. Then, at step 114, retrieving, by the mobile device, a particular one auto-reply message specific to the at least one designated contact group identified, the particular one auto-reply message retrieved having been pre-selected by the receiving party and associated with the at least one designated contact group thereby. At step 116, transmitting, by the mobile device, the particular one auto-reply message retrieved to the sending party, and the operations end.

Figure 2:
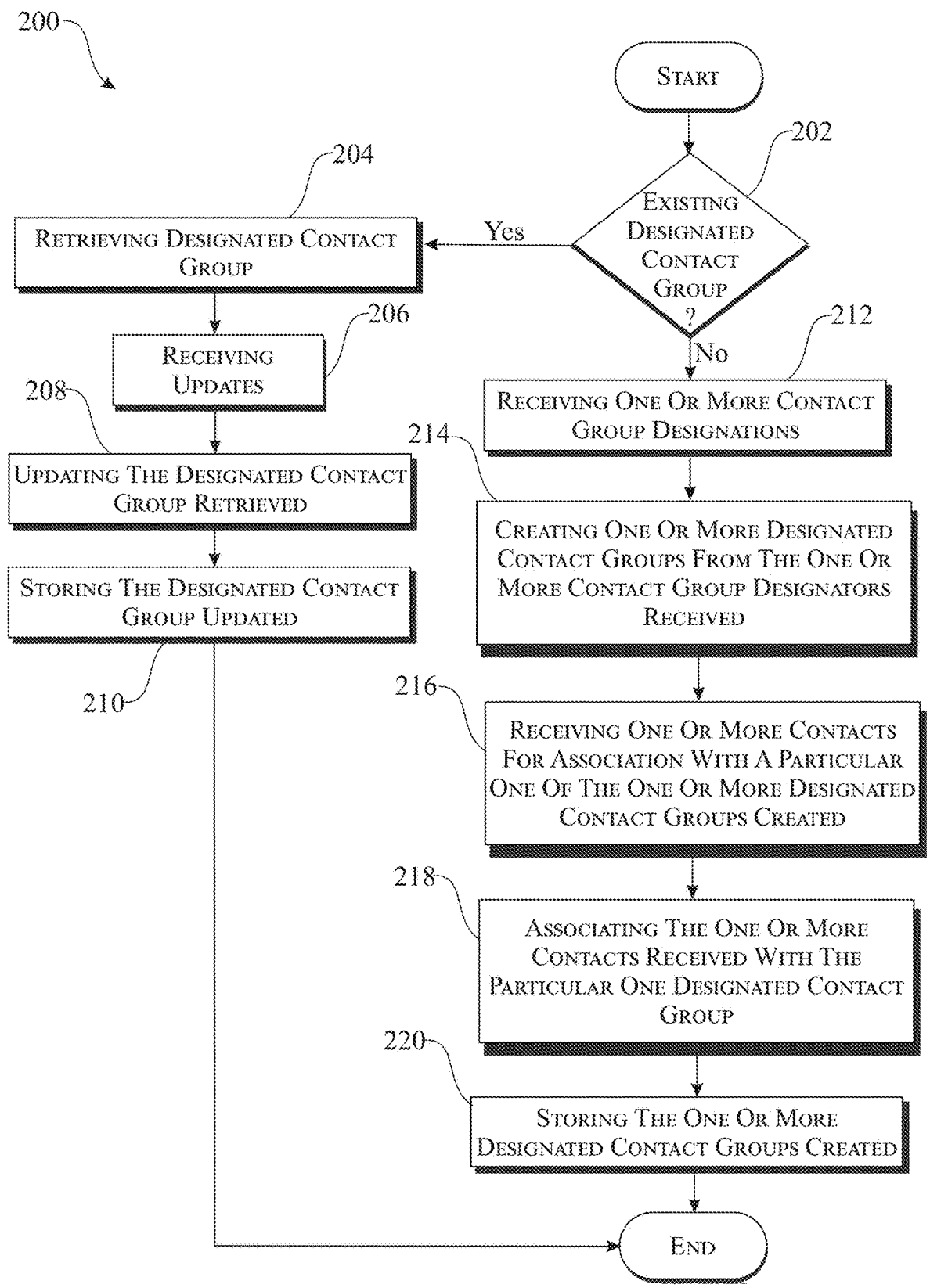
FIG. 2 presents a flowchart of illustrative operations for creating and managing designated contact groups in accordance with an embodiment.

Turning our attention to FIG. 2, a flowchart of illustrative operations 200 is shown for creating and managing designated contact groups in accordance with an embodiment. In accordance with the various aspects of the embodiments herein, designated contact groups are created and managed by an individual user (e.g., a receiving party) desiring to employ the customizable auto-reply messaging on their user device (e.g., a mobile device). As such, at step 202, a determination is made as to whether the designated contact group is an existing group. If so, then at step 204, retrieving the designated contact group (e.g., from memory 306 of their user device 300; see FIG. 3). At step 206, receiving the updates from the individual user, and updating the designated contact group retrieved, at step 208. The updates may include, but are not limited to, contact name, contact information, and the content of the auto-reply message for the particular designated group. At step 210, storing the updated designated contact group (e.g., in the memory 306) and the updating operations end. If the designated contact group is to be created, then at step 212, receiving one or more contact group designations (e.g., business associates) and, at step 214, creating one or more designated contact groups form the one or more contact group designations received. At step 216, receiving one or more contacts for association with the a particular one of the one or more designated contact groups created. That is, in accordance with the embodiments herein, each designated contact group will have one or more contacts/members therein as designated by the particular user (i.e., receiving party). As noted herein above, in accordance with the embodiments herein, such designated contact groups may include parties (i.e., sending parties) employing any communications platform that facilitates communications (e.g., voice or text messaging) between parties, including, but not limited to, well-known social media applications. Then, at step 218, associating the one or more contacts received with the particular one designated contact group, and storing the one or more designated contact groups created, at step 220, thereby completing the operations.

Figure 3:
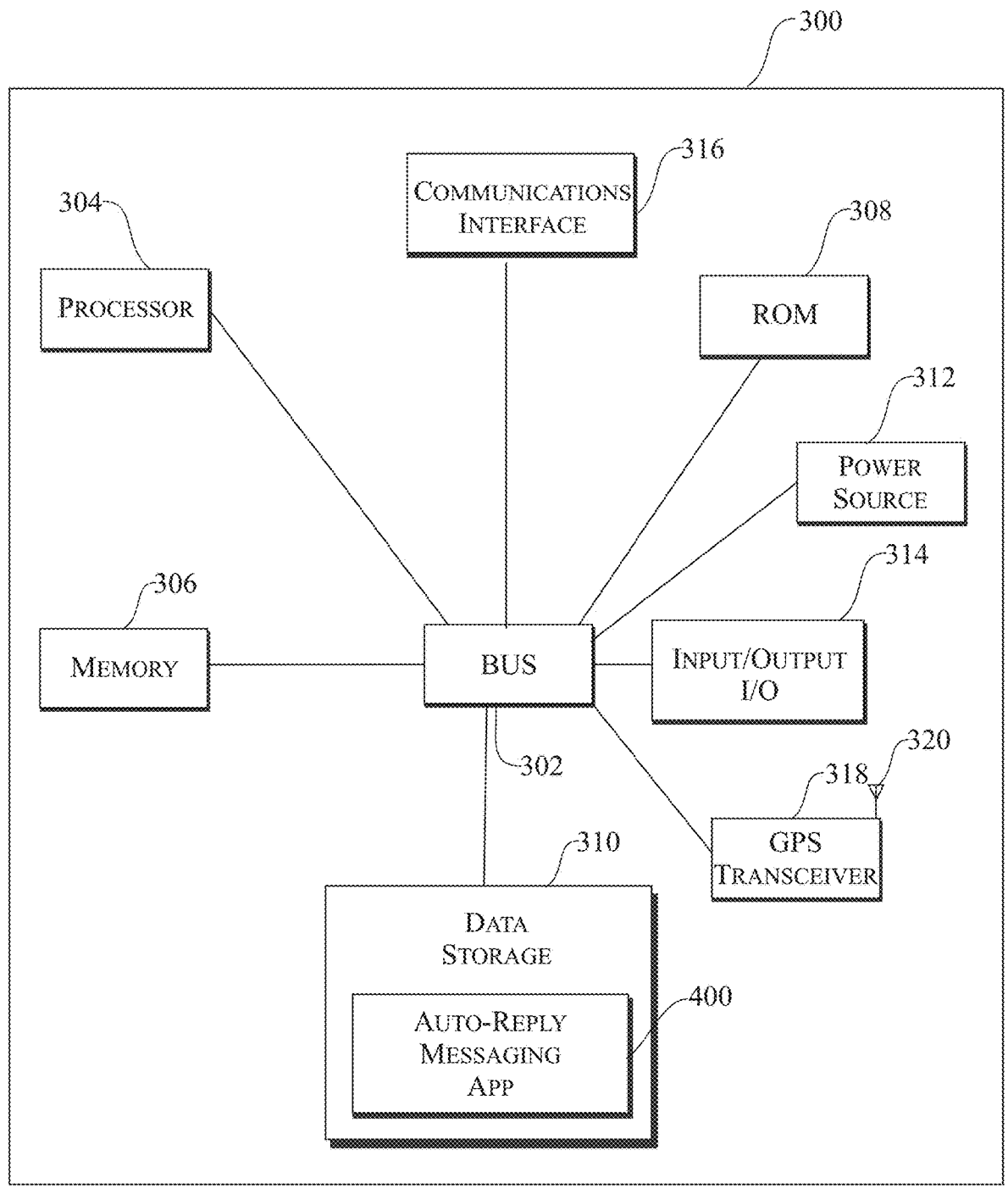
FIG. 3 presents an illustrative user device configured in accordance with an embodiment.

Turning our attention to FIG. 3, an illustrative user device 300 is shown configured for use in accordance with an embodiment. The user device 300 typically includes bus 302 and processor 304 coupled to the bus 302 for executing operations and processing information. For example, the execution of the auto-reply messaging app 400 as will be discussed in much greater detail herein below. As will be appreciated, a "user device" in the context herein may comprise a wide variety of devices such as any type of mobile devices, smartphones, laptop computers, desktop computers, tablets, hardware devices, and wearable devices, to name just a few, that execute applications (e.g., a mobile application) in accordance with the principles of the disclosed embodiments herein. Further, in various embodiments, the user device is associated with a particular mobile telephone number and the operations activated when associated with such mobile telephone number. In an embodiment, the mobile telephone number need not be known in advance such that the mobile telephone number may be added to any designated contact group hereunder in real-time (i.e., on-the-fly). This will be advantageous, for example, if the incoming communication is from such an unknown mobile telephone number (e.g., from a spam caller or stranger) such that the user may add this mobile telephone number to a particular designated contact group that will send the specified auto-reply message, as further detailed herein below. The processor 304, as powered by power source 312, may include both general and special purpose microprocessors, and may be the sole processor or one of multiple processors of the device. Further, the processor 304 may comprise one or more central processing units (CPUs) and may include, be supplemented by, or incorporated in, one or more application-specific integrated circuits (ASICs) and/or one or more field programmable gate arrays (FPGAs).

The user device 300 may also include memory 306 coupled to the bus 302 for storing computer-readable instructions to be executed by the processor 304. The memory 306 may also be utilized for storing temporary variables or other intermediate information during the execution of the instructions by the processor 304. The user device 300 may also include read-only memory (ROM) 308 or other static storage device coupled to the bus 302. Further, data storage device 310, such as a magnetic, optical, or solid-state device may be coupled to the bus 302 for storing information and instructions for the processor 304 including, but not limited to, the auto-reply messaging app 400. Data storage device 310 and the memory 306 may each comprise a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The user device 300 may also include one or more communications interface 316 for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 316 may be an integrated services digital network (ISDN) card or modem/router used to facilitate data communications of various well-known types and formats. Further, illustratively, the communications interface 316 may be a local area network (LAN) card used to provide data communication connectivity to a comparable LAN. Wireless communication links may also be implemented. The Global Positioning System (GPS) transceiver 318 and antenna 320 facilitate delivery of location-based services in order to register the exact location of the user device 300, for example, as the user roams from one location to another location. As will be understood, the application herein will be able to track individual users and their location upon the launching of the application thereby enabling the well understood GPS location features of the user device 300 (e.g., a smartphone) such that an aspect of any designated contact group may include a particular location. For example, the particular one designated contact group that the sending party is a member comprises location information useful for a location-based service (e.g., GPS) to locate the sending party's location upon transmission of the incoming communication thereby and transmitting a customized auto-reply message that considers such current location.

As will be appreciated, the functionality of the communication interface 316 is to send and receive a variety of signals (e.g., electrical, optical, or other signals) that transmit data streams representing various data types. The user device 300 may also include one or more input/output devices 314 that enable user interaction with the user device 300 such as a camera, display, touchscreen, keyboard, mouse, speakers, microphone, buttons, etc. The input/output devices 314 may include peripherals, such as a camera, printer, scanner (e.g., QR-code scanner), touchscreen display, etc. For example, the input/output devices 314 may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 300 or an associated display device, for example.

Figure 4:
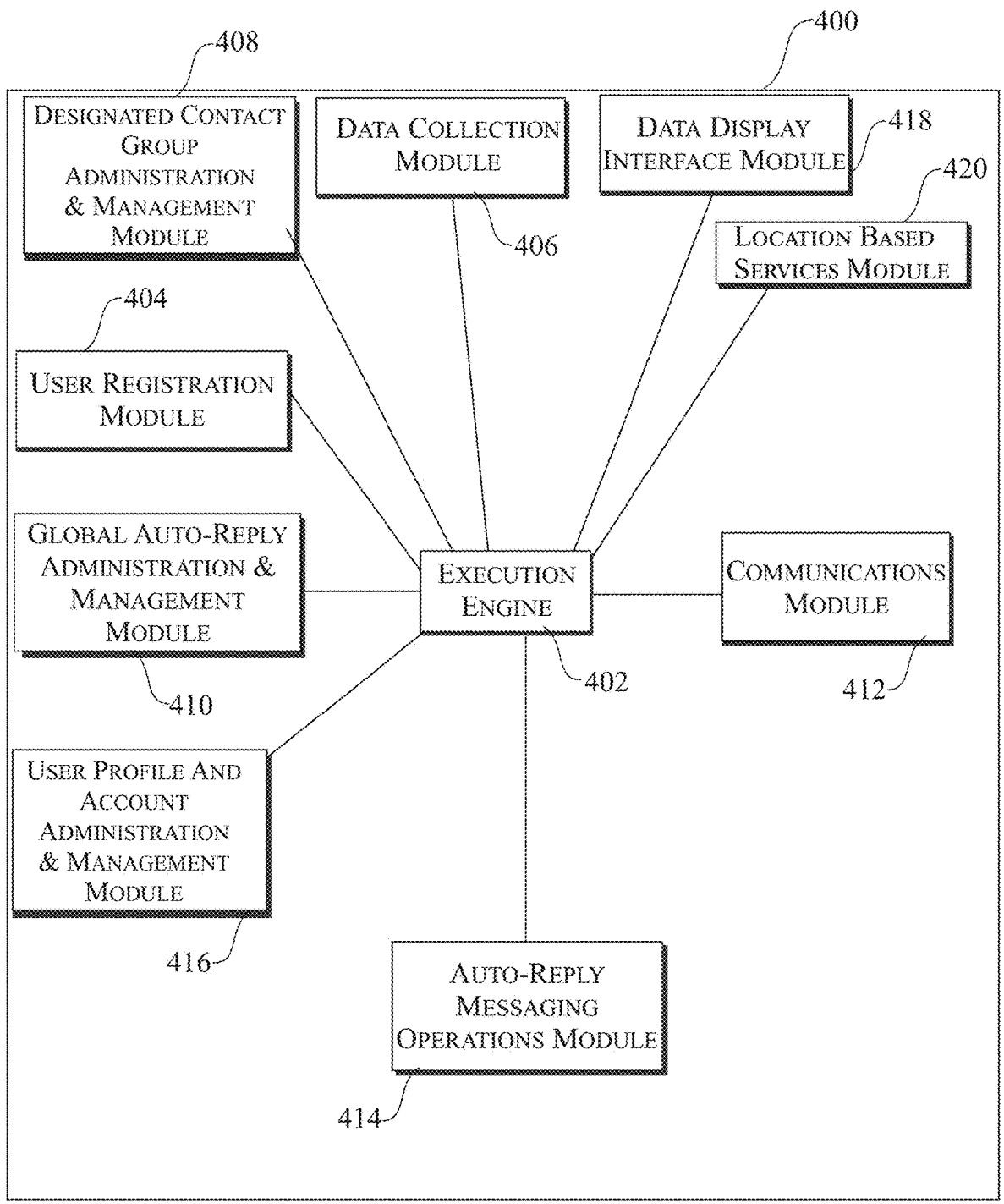
FIG. 4 presents an illustrative architecture for an auto-reply messaging app in accordance with an embodiment.

Turning our attention to FIG. 4, an illustrative architecture for the operation of the auto-reply messaging app 400 is presented in accordance with an embodiment. As will be appreciated, the architecture may be used, illustratively, in conjunction with a cloud network and/or the user device 300 for launching and executing the auto-reply messaging app 400 and its associated operations. As shown, the architecture for the operations of the auto-reply messaging app 400 provides several interfaces and engines used to perform a variety of functions such as the collection, aggregation, manipulation, processing, analyzing, verification, authentication, and display of applicable real-time information and data that are useful to realize the delivery of the customizable auto-reply messaging operations of the disclosed embodiments. More particularly, data display interface module 418 and communications module 412 are used to facilitate the input/output and display of electronic data and other information to, illustratively, a user employing the user device 300 (e.g., a touch screen of the user device 300) and executing the auto-reply messaging app 400. The data collection module 406 facilitates data gathering from the plurality of users and other third parties. The location-based services module 420 provides for the delivery of location-based services in order for the geographic locations of the users to be identified and displayed (e.g., GPS locations), as detailed above. The communications module 412 will also facilitate communications by and through a wireless communications network, for example.

Execution engine 402 may be employed to deliver the customizable auto-messaging services herein through the execution of the auto-reply messaging app 400. In such delivery, the execution engine 402 will operate and execute with at least the following program modules: user registration module 404 for registering user(s) with the auto-reply messaging app 400, data collection module 406 for collecting the customizable information from the user, designated contact administration and management module 408 for the various operations necessary to manage and administer the designated contact groups created by the user, global auto-reply administration and management module 410 for facilitating the optional global auto-reply operations upon user activation, communications module 412, auto-reply messaging operations module 414 for facilitating the delivery of the customizable auto-messaging operations as detailed herein above, and user profile and account administration and management module 416 for administering to user profiles and associated accounts in execution of the auto-reply messaging app 400. The operations executed by the foregoing modules are, for example, as discussed herein above with reference to at least FIGS. 1 and 2.

Those skilled in the art will readily appreciate that stored computer instructions and/or systems configurations may be configured in any way while still accomplishing the various goals, features, and advantages according to the present disclosure. The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system. Accordingly, the applications and programs, for example, may be written using any number of programming languages and/or executed on compatible platforms including, but not limited to, JavaScript, PHP (PHP: Hypertext Preprocessor), WordPress, Drupal, Laravel, React.js, Angular.js, and Vue.js. Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions (e.g., of non-transitory computer readable mediums) may execute entirely on one or more standalone computers, partly on one or more standalone computers, as a standalone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including local area networks (LANs), wide area networks (WANs), through the Internet (e.g., using an Internet Service Provider), or the connection may be made to external computers.

Figure 5:
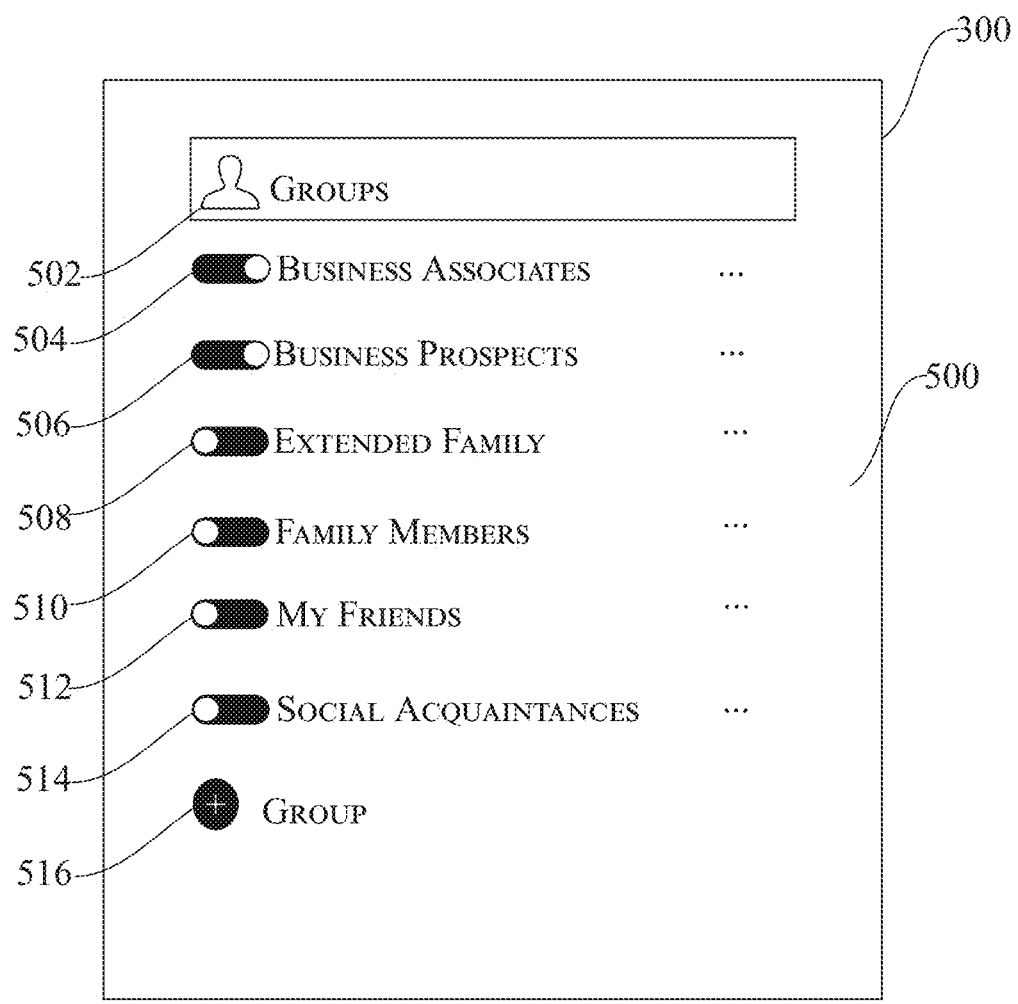
FIG. 5 presents an illustrative user device interface for operating with designated contact groups in accordance with an embodiment.

Turing our attention to FIG. 5 an illustrative user device interface 500 is presented for operating with designated contact groups in accordance with an embodiment. Illustratively, as shown in FIG. 5, user interface 500 is a mobile user interface, as displayed by and through the user device 300. As shown, the user device interface 500 comprises at least groups 502 for displaying one or more of the user's existing designated contact groups. For example, groups 502 may include designated contact groups encompassing business associates 504, business prospects 506, extended family 508, family members 510, my friends 512, and social acquaintances 514. As shown, each of individual existing designated contact groups of the groups 502 is selectable (i.e., active or deactivate) using a toggle feature as presented by and through the user device interface 500. Further, groups 516 allows the user to initiate creating and adding a new designated contact group, as previously detailed hereinabove.

Figure 6:
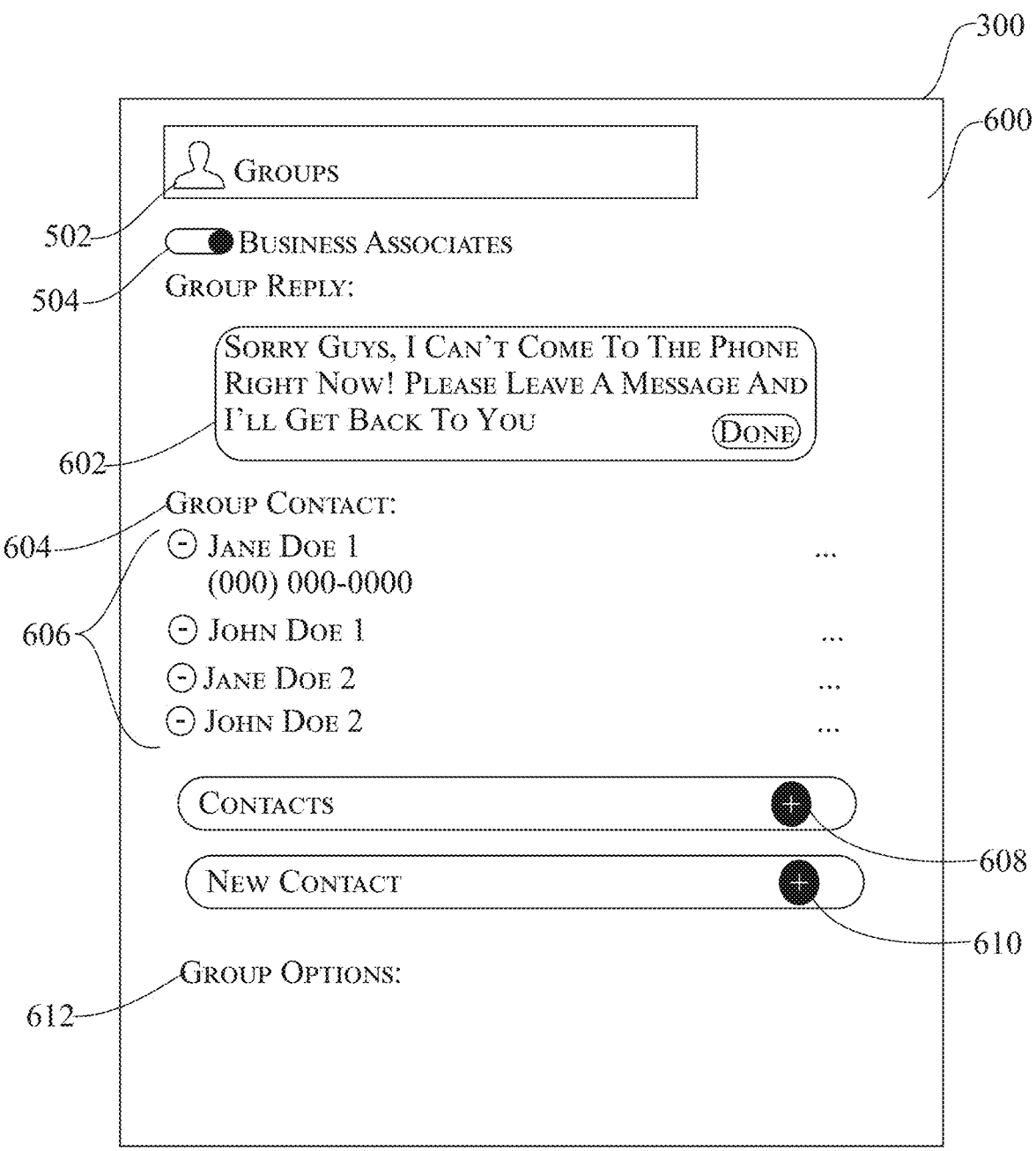
FIG. 6 presents an illustrative user device interface for customizing designated contact groups in accordance with an embodiment.

FIG. 6 presents an illustrative user device interface 600 for customizing designated contact groups in accordance with an embodiment. Illustratively, as shown in FIG. 6, user interface 600 is a mobile user interface, as displayed by and through the user device 300. As shown, the user device interface 600 comprises at least groups 502 and a user selection specific to the business associates designated contact group 504 (see, FIG. 5). In this way, as detailed herein above, the user is able to create a customized auto-reply message 602 for use with business associates designated contact group 504 such that when a message is received from one of group contacts 604 the customized auto-reply message is transmitted to the sending party. For example, the sending party may be one of a plurality of designated contact groups 606 as previously defined by the user (i.e., the receiving party). Further, the user may employ contacts 608 to modify one of the existing designated contact groups (e.g., the business associates designated contact group 504) in the plurality of designated contact groups 606. New contact 610 facilitates adding anew contact to the existing contacts in the respective existing designated contact group of the plurality of designated contact groups 606 (e.g., the business associates designated contact group 504). Group options 612 provides for the designation of various options for use in administering a particular designated contact group.

Figure 7:
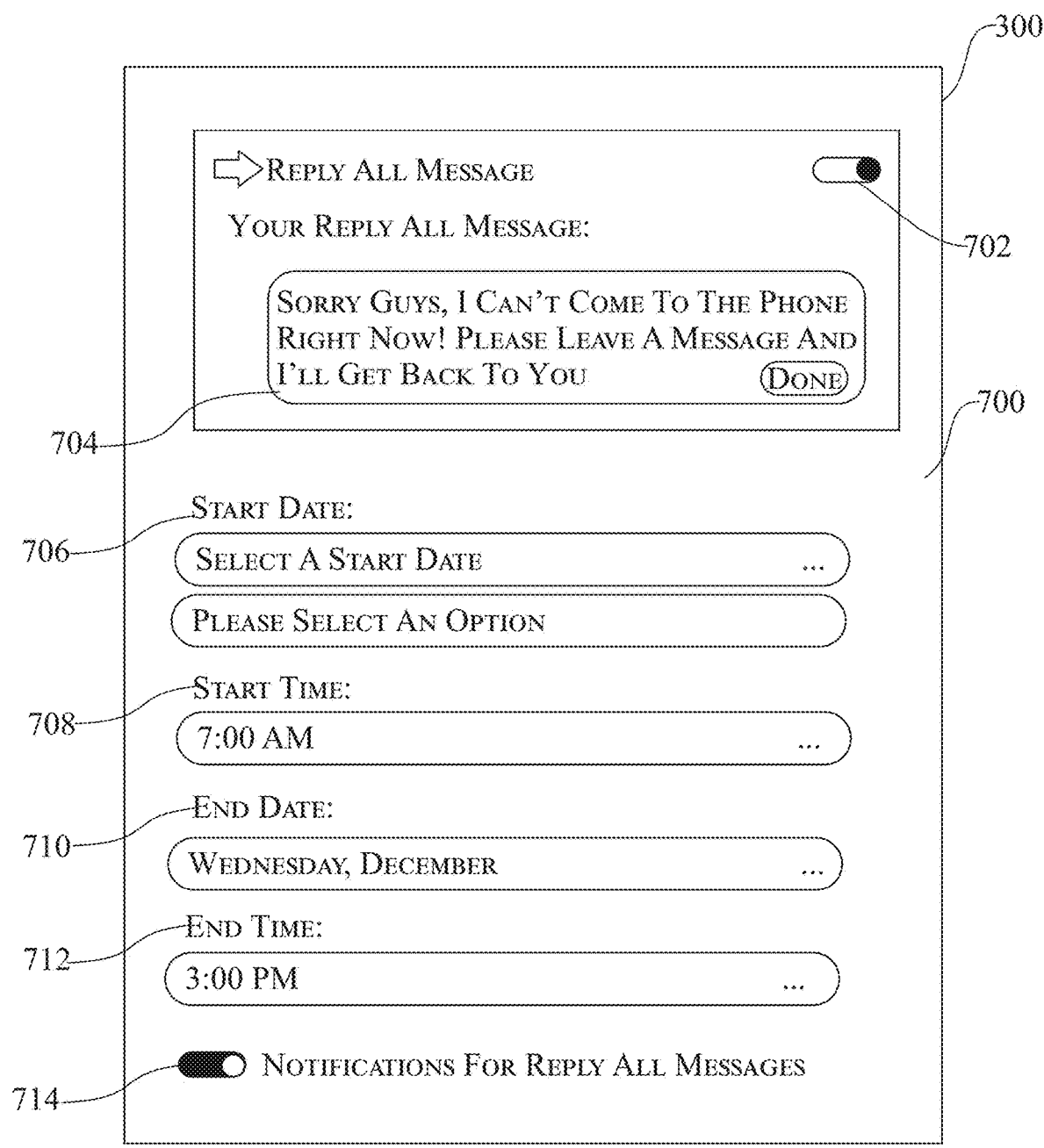
FIG. 7 presents an illustrative user device interface for customizing global auto-replies for all designated contact groups in accordance with an embodiment.

FIG. 7 presents an illustrative user device interface 700 for customizing global auto-replies for all designated contact groups in accordance with an embodiment. Illustratively, as shown in FIG. 7, user interface 700 is a mobile user interface, as displayed by and through the user device 300. As detailed above, global reply feature 702 and notification feature 714 allow the user/receiving party to create, designate, and activate the use of a global auto-reply message 704 that overrides any and all auto-reply messages specific to a designated contact group that would have been otherwise transmitted by the mobile device 300 in response to a message received from one of the designated contact therein. The use of the global auto-reply message 704 will have an associated designated time duration (e.g., start date 706, start time 708, end date 710, and end time 712) defining the total activation time. Upon expiration thereof, the customizable auto-reply messaging operations return to using designated auto-replay message specific to a particular designated contact group.

Figure 8:
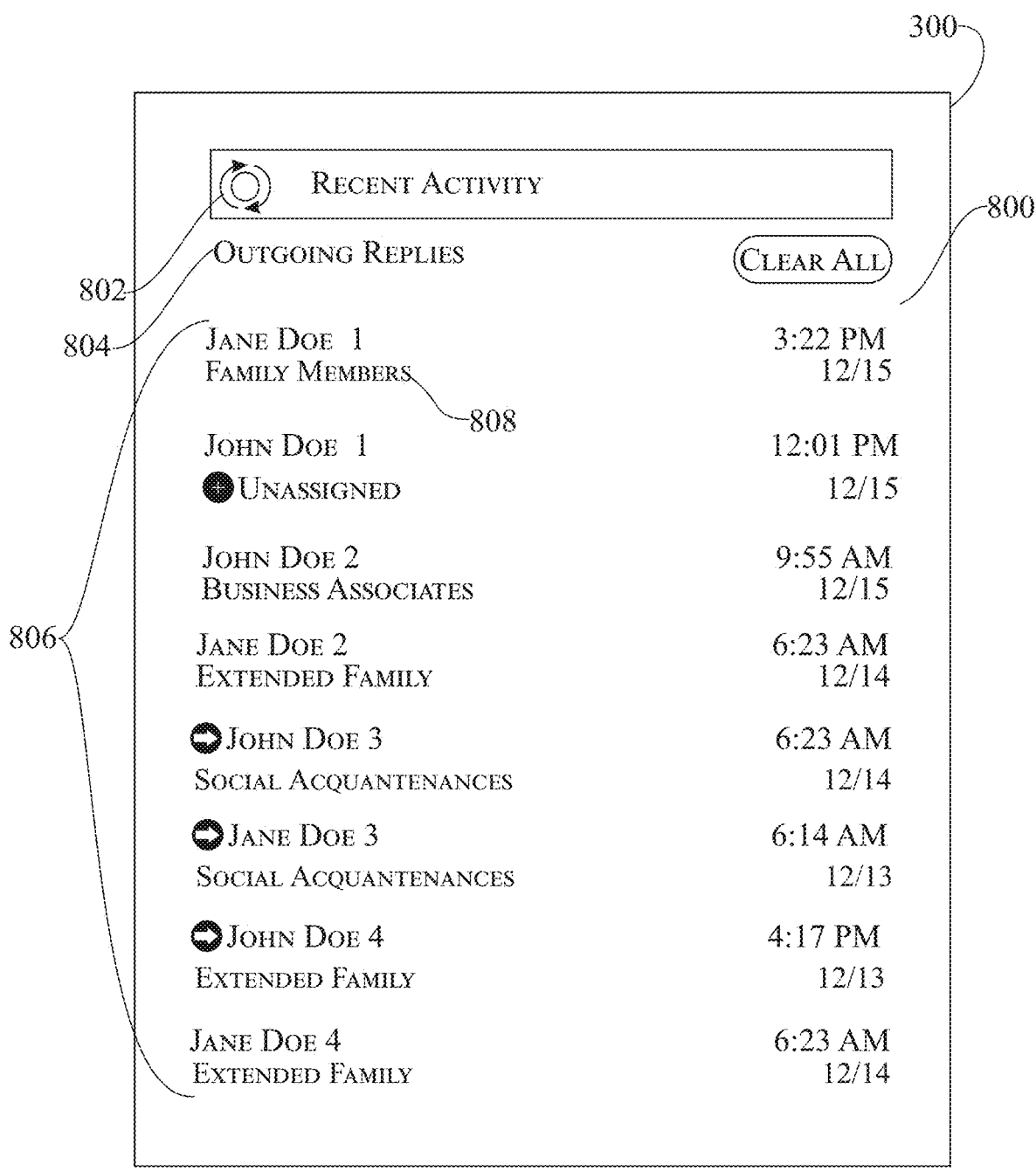
FIG. 8 presents an illustrative user device interface demonstrating auto-reply recent activity in accordance with an embodiment.

FIG. 8 presents an illustrative user device interface 800 demonstrating auto-reply recent activity 802 in accordance with an embodiment. Illustratively, as shown in FIG. 8, user interface 800 is a mobile user interface, as displayed by and through the user device 300. As shown, the user device interface 800 comprises at least recent activity 802 for outgoing replies 804 that comprise a plurality of previous auto-replies 806 (with each having their respective designated contact group 808 associated therewith) that were transmitted by the user device 300 in accordance with the above-detailed aspects of the disclosed embodiments.

As noted above, in some embodiments the method or methods described above may be executed or carried out by a computing system including a non-transitory computer-readable storage medium, also referred to as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method (see, e.g., FIGS. 1-2) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high-level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A method for automatically responding to incoming communications received by a mobile device, the method comprising:
   receiving, by the mobile device, an incoming communication from a sending party to a receiving party associated with the mobile device, wherein the mobile device is currently in an auto-reply mode;
   identifying, by the mobile device, at least one designated contact group that the sending party is a member, the at least one designated contact group having been previously created by the receiving party associated with the mobile device and comprising one or more members thereto;
   retrieving, by the mobile device, a particular one auto-reply message specific to the at least one designated contact group identified, the particular one auto-reply message retrieved having been pre-selected by the receiving party and associated with the at least one designated contact group thereby;
   determining whether a global response option has been activated; and
   if the global response option is determined to be activated, then retrieving a global auto-reply message, and transmitting, by the mobile device, the global auto-reply message retrieved to each one of the one or more members of the at least one designated contact group identified in place of the particular one auto-reply message retrieved, otherwise:
   transmitting, by the mobile device, the particular one auto-reply message retrieved to the sending party.

2. The method of claim 1, wherein the method further comprises:
   receiving an instruction to activate the global response option.

3. The method of claim 1, wherein the method further comprises:
   creating, by the receiving party, a plurality of designated contact groups.

4. The method of claim 3, wherein the method further comprises:
   creating an auto-reply message specific to each one of the designated contact groups in the plurality of designated contact groups.

5. The method of claim 3, wherein each one of the designated contact groups in the plurality of designated contact groups comprise at least one contact designated by the receiving party together with contact information specific to the at least one contact designated.

6. The method of claim 3, wherein the method further comprises:
   storing, in a memory of the mobile device, the plurality of designated contact groups created.

7. The method of claim 3, wherein the plurality of designated contact groups comprise at least one designation of business associates, business contacts, extended family, immediate family, friends, and social acquaintances.

8. The method of claim 1, wherein the method further comprises:
updating the at least one designated contact group.

9. The method of claim 1, wherein the method further comprises:
adding a new contact to the at least one designated contact group.

10. The method of claim 1, wherein the at least one designated contact group that the sending party is a member thereof comprises location information useful for a location-based service to locate the sending party upon transmission of the incoming communication thereby.

11. The method of claim 1, wherein the incoming communication received is a text message.

12. The method of claim 1, wherein the incoming communication received is a voice communication.

13. A method for automatically responding to incoming communications received by a mobile device, the method comprising:
creating, by a receiving party, a plurality of designated contact groups, each designated contact group comprising one or more members;
storing the plurality of designated contact groups created;
receiving, by the mobile device, an incoming communication from a sending party to the receiving party associated with the mobile device, wherein the mobile device is currently in an auto-reply mode;
identifying, by the mobile device, at least one designated contact group from the plurality of designated contact groups created that the sending party is a member thereof;
retrieving, by the mobile device, a particular one auto-reply message specific to the at least one designated contact group identified, the particular one auto-reply message having been pre-selected by the receiving party and associated with the at least one designated contact group thereby;
determining whether a global response option has been activated; and
if the global response option is determined to be activated, then retrieving a global auto-reply message, and transmitting, by the mobile device, the global auto-reply message retrieved to each one of the one or more members of the at least one designated contact group identified in place of the particular one auto-reply message retrieved, otherwise:
transmitting, by the mobile device, the particular one auto-reply message retrieved to the sending party.

14. The method of claim 13, wherein the method further comprises:
updating at least one of the designated contact groups of the plurality of designated contact groups created.

15. The method of claim 13, wherein each one of the designated contact groups in the plurality of designated contact groups created comprise contact information specific to the one or members thereof.

16. The method of claim 13, wherein the incoming communication received is either a text message or a voice communication.

17. A method for automatically responding to incoming communications received by a mobile device, the method comprising:
creating, by a receiving party, a plurality of designated contact groups, each designated contact group comprising one or more members and at least one designation of business associates, business contacts, extended family, immediate family, friends, and social acquaintances;
storing the plurality of designated contact groups created;
receiving, by the mobile device, an incoming communication from a sending party to the receiving party associated with the mobile device, wherein the mobile device is currently in an auto-reply mode;
identifying, by the mobile device, at least one designated contact group from the plurality of designated contact groups created that the sending party is a member thereof;
retrieving, by the mobile device, a particular one auto-reply message specific to the at least one designated contact group identified, the particular one auto-reply message having been pre-selected by the receiving party and associated with the at least one designated contact group thereby;
determining whether a global response option has been activated; and
if the global response option is determined to be activated, then retrieving a global auto-reply message, and transmitting, by the mobile device, the global auto-reply message retrieved to each one of the one or more members of the at least one designated contact group identified; otherwise transmitting, by the mobile device, the particular one auto-reply message retrieved to the sending party.

* * * * *